United States Patent [19]

Pappas

[11] Patent Number: 4,743,280
[45] Date of Patent: May 10, 1988

[54] AIR FILTER APPARATUS

[76] Inventor: Phillip M. Pappas, 12309 Hodges St., Houston, Tex. 77085

[21] Appl. No.: 842,925

[22] Filed: Mar. 24, 1986

[51] Int. Cl.$^4$ .................... B01D 46/12; B01D 46/42
[52] U.S. Cl. ............................ 55/429; 55/483; 55/484; 55/DIG. 36
[58] Field of Search .......... 55/429, 481, 483, 484, 55/494, 521, DIG. 36

[56] References Cited

U.S. PATENT DOCUMENTS

| | | | |
|---|---|---|---|
| 540,856 | 6/1895 | Dodge | 55/481 X |
| 2,016,033 | 10/1935 | Christofferson | 55/484 |
| 2,966,959 | 1/1961 | Neumann | 55/484 |
| 3,026,967 | 3/1962 | Stevens et al. | 55/521 X |
| 3,246,456 | 4/1966 | Sharp | 55/481 |
| 3,247,652 | 4/1966 | Annas et al. | 55/481 |
| 3,379,477 | 4/1968 | Beckmeyer | 55/481 X |
| 3,383,841 | 5/1968 | Olson et al. | 55/481 X |
| 3,425,334 | 2/1969 | Brown et al. | 55/483 X |
| 3,470,680 | 10/1969 | Avera | 55/521 X |
| 3,478,483 | 11/1969 | Baker | 55/521 X |
| 3,566,585 | 3/1971 | Voloshen et al. | 55/DIG. 36 X |
| 3,691,736 | 9/1972 | Neumann | 55/521 X |
| 3,834,135 | 9/1974 | Jordan | 55/DIG. 36 X |
| 3,870,494 | 3/1975 | Doane | 55/DIG. 36 X |
| 4,047,519 | 9/1977 | Nett | 55/DIG. 36 X |
| 4,105,422 | 8/1978 | Kiguchi | 55/484 X |
| 4,556,046 | 12/1985 | Riffel et al. | 55/DIG. 36 X |

FOREIGN PATENT DOCUMENTS 511899 12/1958 Italy ...................... 55/484

OTHER PUBLICATIONS

"Airsan Mod-Unit Kitchen Ventilating System", Bulletin AD-112, Air Filter Corp., Milwaukee, Wis.
"Grease Filters", Form No. GF-1492, Research Products Corp., Madison, Wis. 10-62.

Primary Examiner—Kathleen J. Prunner

[57] ABSTRACT

A removable, washable air filter apparatus is formed with two V-shaped rectangular mesh filters held in place side by side within a housing with the vertices of the V filters draining grease and moisture into a removable pan. A mounting bracket maintains the pan in position to receive extracted grease and moisture without impeding air flow through the exposed filter mesh. The top edges of the housing have outwardly formed flanges for removably mounting the housing by means of overlying swivel retainers provided around the periphery of mating flanges on an intake opening of a ventilation hood or air duct.

3 Claims, 2 Drawing Sheets

AIR FILTER APPARATUS

This invention relates to air filter apparatus used at the air intake of air ducts, and power ventilated hoods of the ducted or ductless recirculating type.

Standard flat filters of metal or plastic mesh are widely used in ducts and hoods over ranges, fryers, broilers and other cooking equipment with the draft or suction of a fan or blower pulling moisture laden air through mesh filters with the grease and moisture in the air from cooking vapors becoming deposited on the surfaces of the mesh filters. A grease and moisture laden atmosphere as is common with grilling, broiling and frying will quickly cause a mesh filter to become partly clogged with grease and moisture to the extent that the air flow through the filter is impeded cutting the efficiency of the hood or air duct system.

Metal mesh filters are easily washable, but this is not practical or practiced at frequent intervals. Clogging filters with resultant loss of air flow lead to higher temperatures of fan and blower motors with further efficiency loss and even fire hazard in cases of grease laden wiring, motors, fans and ducts, hence, one can understand and appreciate the desirability and even the necessity for air filters that will maintain high efficiency for longer time with easy removability and cleanability.

With these and other factors in mind my invention was conceived to provide a simple removal air filter apparatus utilizing standard inexpensive flat rectangular mesh filters, V formed and removable, within an easily removable housing and further with a removable pan to receive the dripping grease and moisture from the V formed filters. This further enhances the efficiency and utility of my filter apparatus as the National Fire Protective Association Code No. 96 and other safety and regulatory codes require vapor removal with mesh filters and in ducted hoods said filters must be installed at an angle of not less than 45 degrees from the horizontal and must be equipped with a drip pan or tray beneath the lower edge of the filters. Also one can appreciate the desirability of the pan to prevent grease drippings from draining on foods being cooked below. It will be further noted that my disclosure with two V formed filters at one air inlet doubles the filter area that would normally be provided if just one flat rectangular filter was utilized over a flat horizontal air inlet as is standard practice with range hoods.

With my filter apparatus a standard activated charcoal flat filter can be easily installed horizontally above the two V formed filters and maintain its original efficiency for a much longer period of time than with a flat mesh filter installed horizontally against a flat activated charcoal filter as the flat mesh filter allows the activated charcoal filter to get grease and moisture across its surface, greatly reducing its efficiency and air handling capability, and as such activated charcoal filters are not washable, same must be replaced whenever its gets grease and moisture over is surface.

With the foregoing and other objects in view, my invention comprises certain novel constructions, combinations, and arrangements of parts as will be hereinafter fully described, illustrated in the accompanying drawings, and more particularly pointed out in the appended claims.

Figure 1:
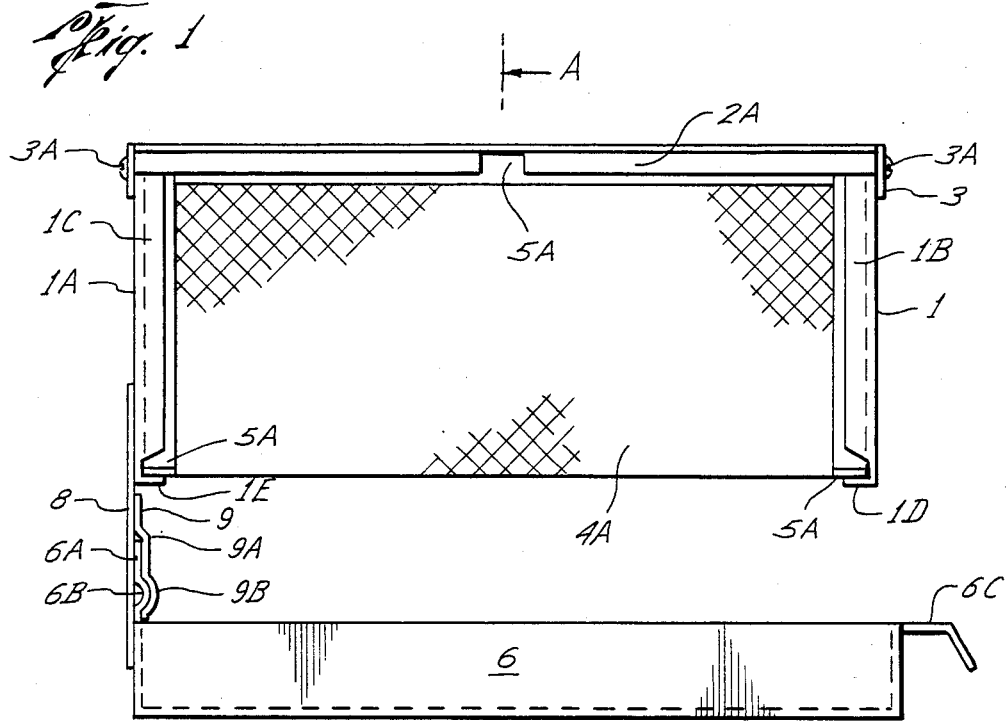
FIG. 1 is a side elevation showing the filter housing, the side of one mesh filter and the removable, slidable drip pan bracketed to the filter housing.

Referring to the drawings in detail:

FIG. 1—Parts 1 and 1A are the front and rear housing closure members respectively, spaced apart and held together by angle members 2 and 2A, preferably resistance welded, at their respective corners to 1 and 1A. A removable cross member 3 overlies the abutting edges of V formed metal mesh filters 4 and 4A which are placed side by side in the housing and held fixedly by overlying crossmember 3 with bolts 3A holding outer flanged portions to front and rear housing closure members 1 and 1A respectively. Extending flat tongue portions 7 and 7A hold outer top frame portions 5 and 5A in place so horizontal flange portions of angle members 2 and 2A may seal against the underside of an air intake opening of a power hood or air duct which is provided with overlying swivel type retainers around the periphery to retain the housing closure members in place. Extending from and attached to the rear housing closure 1A is support member 8 with attached formed clip member 9 having a lateral formed offset 9A and a lateral formed half round portion 9B holding the upward extending rear lateral half round formed portion 6B of back 6A of sliding pan 6. It will be noted that back 6A of pan 6 may be slidably removed or inserted underneath clip 9 and in front of support 8 from either side of the filter apparatus and that same cam be centered under the vertices of the mesh filters 4 and 4A to receive and contain drippings from the V filters as shown in FIGS. 3 and 4.

Figure 2:
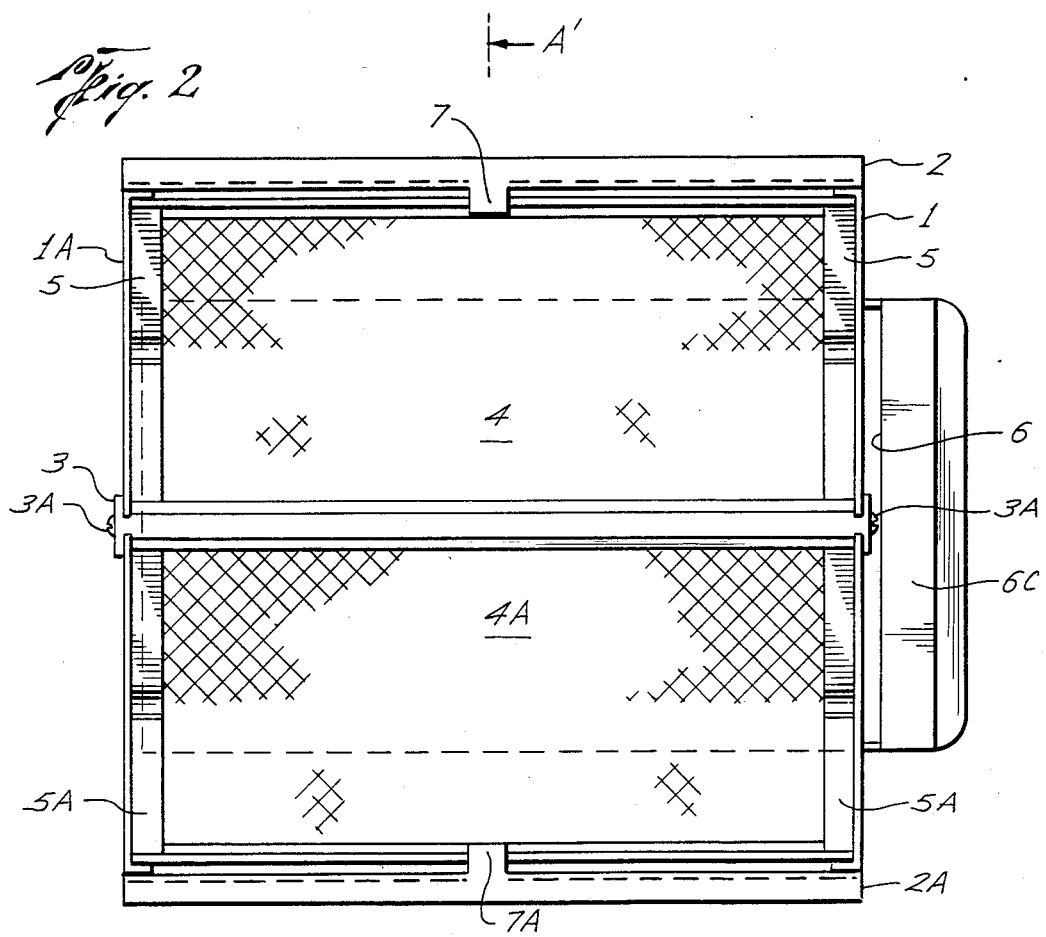
FIG. 2 is a top view looking down into the two V formed filters.

FIG. 2—Filters 4 and 4A with their perimeter supports or frames 5 and 5A are held in place by overlying support member 3 at their abutted edges, by tongues 7 and 7A at their outer edges and at front and rear by housings 1 and 1A.

Figure 3:
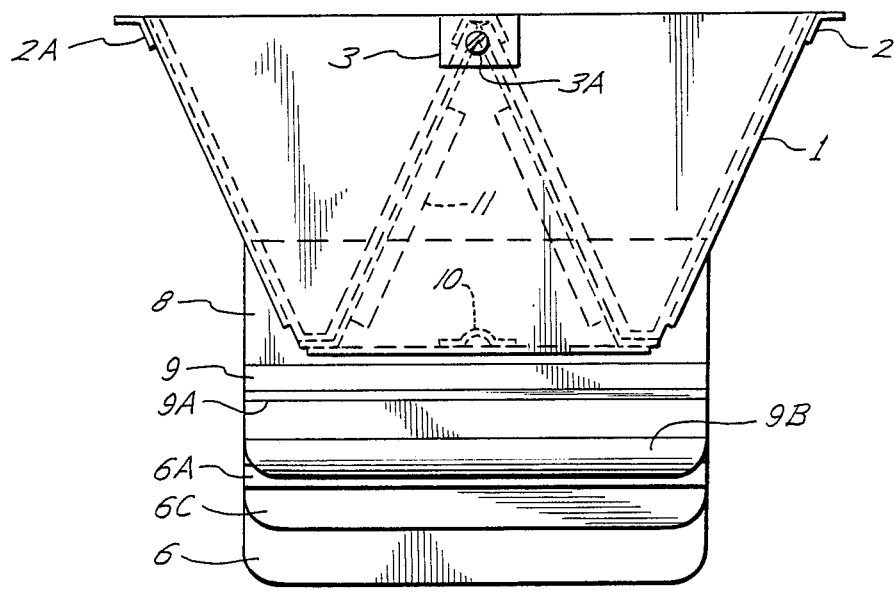
FIG. 3 is a front elevation showing the front of the filter housing, the rear bracket and the front of the slidable drip pan.

FIG. 3—Pan 6 with extending front handle 6C with rear slide mounting is fixedly positioned below vertices of formed V filters 4 and 4A.

Figure 4:
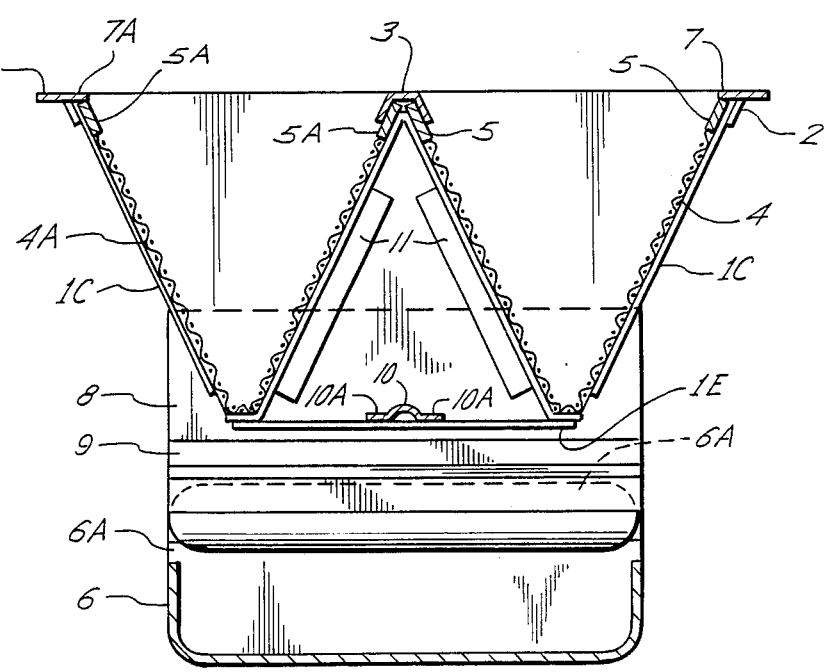
FIG. 4 is a front elevation cut away taken along line A—A' of FIG. 1 and looking in the direction of the arrows.

FIG. 4—Inverted V angles 11 attached or post welded to the inner sides of front and rear closures 1 and 1A respectively support and retain the inner V portions of mesh filters 4 and 4A. These inverted V angles also serve to seal the inner frames 5 and 5A of the filters just as the inward formed angle portion 1B of front housing 1 and the inward formed angle portion 1C of rear housing 1A support and retain the outer V portions of mesh filters 4 and 4A as well as seal the outer V portions of frames 5 and 5A. Half round formed member 10 provided with extended portions 10A serves as a tie bar or reinforcing member between front housing 1 and rear housing 1A as extending portions 10A are welded or secured to inward formed horizontal angle portions 1D and 1E respectively.

It will be noted that with the two side by side mesh filters in their position within the housing with the overlying inverted V formed tie bar screwed to the front and rear housing members 1 and 1A by screws 3A, all of the mesh area of both V filters is exposed for maximum filter area and that the intake area at the top of the housing as shown in the top view of FIG. 2 is considerably less than the total mesh intake area. Further with overlying swivel clips or retainers provided on an air intake opening of an air duct or hood the top flanges 2 and 2A permit easy installation or removal of the entire apparatus by means of the swivel retainers mounted to the underside of the duct or hood in a manner to permit their swiveling over the flanges 2 and 2A to retain the filter apparatus in place in a relatively air tight manner.

While I have described the preferred embodiments of my invention and illustrated same in the accompanying drawings, certain minor changes or alterations may appear to one skilled in the art to which this invention relates during the extensive manufacture of same, and I therefore reserve the right to make such alterations or changes or shall fall within the scope of the appended claims.

I claim:

1. An air filter apparatus comprising two elongated substantially V-shaped mesh filters held in place side by side by front and rear housing closures, said closures being spaced apart by two parallel outwardly formed angle members attached to opposite top edges of the front and rear housing closures, a removable V formed cross member disposed to seal and retain abutting inner edges of the filters, the removable cross member having outer flanged portions with bolts holding said flanged portions against the front and rear closures, a formed member welded to lower inwardly formed angle portions of the front and rear closures, inverted V angles welded to the front and rear closures so as to support and contain the inner facing sides of the V-shaped filters, and the rear housing closure having an attached support member extending downwardly therefrom, an overlying clip member secured to the support member and having a lateral half round formed portion engaging a mating laterally formed half round portion of an upwardly extending back of a slidably removable pan positioned to receive grease and moisture from the vertices of the two V-shaped filters without impeding air flow through the vertices.

2. An air filter apparatus comprising two juxtaposed V-shaped metal mesh filters contained perpendicularly between front and rear housing closures with sides and bottoms of the closures having inwardly formed angle portions, the closures being spaced apart by the juxtaposed filters and further being spaced apart at their top corners by two outwardly formed angle members secured to the inwardly formed angle portions of the sides, the front and rear housing closures further being spaced apart and secured by a formed member secured to each inwardly formed bottom angle portion, the front and rear housing closures further being spaced apart and secured by a removable V-shaped cross member securing inner abutted upper edges of the filters, the front and rear closures having secured to their inner central surfaces inverted V-shaped angles to retain and seal inner side edges of the two filters, the rear closure having a downwardly extending support member, an overlying clip member secured to the support member and having a lateral half round formed portion engaging a mating lateral half round formed portion of an upwardly extending back of a slidably removable pan positioned to receive grease and moisture from the vertices of the two V-shaped filters without impeding air flow through the vertices and providing visual observation of the pan.

3. An air filter apparatus comprising a plurality of V-shaped filters held in place side by side by front and rear housing closures having inwardly extending angle portions on their side and bottom edges, opposed inverted V angles secured to inner surfaces of the front and rear housing closures so as to retain the inner facing sides of the V-shaped filters, two parallel angle members secured at opposite upper angled edges of the front and rear closures with the parallel angle members retaining upper edges of the outer V-shaped filters and spacing apart upper edges of the front and rear closures, a removable cross member retaining and sealing upper edges of the inner abutting V-shaped filters, a lower formed member secured to the bottom inwardly extending angle portions of the front and rear closures, the rear closure having an attached support member extending downwardly therefrom, an overlying clip member secured to the support member so as to retain and slidably support a removable pan having an upwardly extended back formed with a lateral half round portion engaging a mating lateral half round formed portion of the overlying clip member so as to position the slidably mounted pan in position beneath the vertices of the V-shaped filters to receive drippings without impeding air flow through the vertices.

* * * * *